(12) United States Patent
Okada et al.

(10) Patent No.: US 10,610,928 B2
(45) Date of Patent: Apr. 7, 2020

(54) POWDER FOR CONDUCTIVE MATERIAL, INK FOR CONDUCTIVE MATERIAL, CONDUCTIVE PASTE, AND METHOD FOR PRODUCING POWDER FOR CONDUCTIVE MATERIAL

(71) Applicants: SUMITOMO ELECTRIC INDUSTRIES, LTD., Osaka-shi, Osaka (JP); SUMITOMO ELECTRIC PRINTED CIRCUITS, INC., Koka-shi, Shiga (JP)

(72) Inventors: Issei Okada, Osaka (JP); Motohiko Sugiura, Osaka (JP); Yoshio Oka, Osaka (JP); Kenji Ohki, Koka (JP)

(73) Assignees: SUMITOMO ELECTRIC INDUSTRIES, LTD., Osaka-shi, Osaka (JP); SUMITOMO ELECTRIC PRINTED CIRCUITS, INC., Koka-shi, Shiga (JP)

( * ) Notice: Subject to any disclaimer, the term of this patent is extended or adjusted under 35 U.S.C. 154(b) by 38 days.

(21) Appl. No.: 15/761,528

(22) PCT Filed: Sep. 27, 2016

(86) PCT No.: PCT/JP2016/078409
§ 371 (c)(1),
(2) Date: Mar. 20, 2018

(87) PCT Pub. No.: WO2017/057341
PCT Pub. Date: Apr. 6, 2017

(65) Prior Publication Data
US 2019/0054524 A1 Feb. 21, 2019

(30) Foreign Application Priority Data
Sep. 30, 2015 (JP) .................................. 2015-192948

(51) Int. Cl.
*H01B 1/22* (2006.01)
*B22F 1/00* (2006.01)
(Continued)

(52) U.S. Cl.
CPC .............. *B22F 1/0018* (2013.01); *B22F 9/24* (2013.01); *C09D 5/24* (2013.01); *C09D 7/61* (2018.01);
(Continued)

(58) Field of Classification Search
CPC ... H01B 1/00; H01B 1/02; H01B 1/16; H01B 1/22; C09D 5/24; B22F 1/0044; B22F 9/24; C22C 9/00
See application file for complete search history.

(56) References Cited

U.S. PATENT DOCUMENTS 4,687,511 A * 8/1987 Paliwal .................. B22F 1/0048
75/252
5,766,305 A 6/1998 Watabe et al.
(Continued)

FOREIGN PATENT DOCUMENTS

CN 102415222 B 2/2015
JP 2-145735 * 2/1990
(Continued)

OTHER PUBLICATIONS

Mutambara "Resin-gel synthesis and characterization of copper and titanium mixed metal oxides nanoparticles", University of the Witwatersrand, Johannesburg, Feb. 2013.*
(Continued)

*Primary Examiner* — Mark Kopec
(74) *Attorney, Agent, or Firm* — Faegre Drinker Biddle & Reath LLP

(57) ABSTRACT

A powder for a conductive material according to an embodiment of the present invention includes a large number of
(Continued)

particles that contain copper as a main component and having an average primary particle diameter of 1 nm or more and 200 nm or less. The particles contain titanium on surfaces or inside thereof, and a content of the titanium is 0.003 atomic percent or more and 0.5 atomic percent or less.

4 Claims, 1 Drawing Sheet

(51) Int. Cl.
    *C09D 5/24*         (2006.01)
    *B22F 9/24*         (2006.01)
    *C22C 9/00*         (2006.01)
    *H01B 1/16*         (2006.01)
    *H01B 1/02*         (2006.01)
    *C09D 139/06*       (2006.01)
    *C09D 7/61*         (2018.01)
    *C09D 11/52*        (2014.01)
    *C09D 101/02*       (2006.01)
    *C09D 101/12*       (2006.01)
    *C09D 129/04*       (2006.01)
    *C09D 133/10*       (2006.01)

(52) U.S. Cl.
    CPC ............ *C09D 11/52* (2013.01); *C09D 101/02* (2013.01); *C09D 101/12* (2013.01); *C09D 139/06* (2013.01); *C22C 9/00* (2013.01); *H01B 1/026* (2013.01); *H01B 1/16* (2013.01); *H01B 1/22* (2013.01); *B22F 2301/10* (2013.01); *B22F 2301/205* (2013.01); *C09D 129/04* (2013.01); *C09D 133/10* (2013.01)

(56) References Cited

U.S. PATENT DOCUMENTS

| | | |
|---|---|---|
| 6,045,925 A | 4/2000 | Klabunde et al. |
| 6,183,545 B1 | 2/2001 | Okuhama et al. |
| 2012/0031656 A1 | 2/2012 | Oka et al. |

FOREIGN PATENT DOCUMENTS

| | | | |
|---|---|---|---|
| JP | 2-145735 | * | 6/1990 |
| JP | 6-295614 | * | 6/1994 |
| JP | 6-295614 | * | 10/1994 |
| JP | 2009-235556 A | | 10/2009 |
| JP | 2010-192841 A | | 9/2010 |
| JP | 2010-275578 A | | 12/2010 |
| JP | 2013-28859 A | | 2/2013 |
| JP | 2015-168878 A | | 9/2015 |

OTHER PUBLICATIONS

Election/Restriction Requirement issued in U.S. Appl. No. 15/546,093 dated Oct. 3, 2018.
Non-Final Office Action issued in U.S. Appl. No. 15/546,093 dated Dec. 4, 2018.
Notice of Allowance issued in U.S. Appl. No. 15/546,093 dated Jan. 31, 2019.
The Notification of the Second Office Action dated Jan. 14, 2019 to counterpart Chinese Patent Application No. 2016800078713 of U.S. Appl. No. 15/546,093, and its English translation.
"Practical Inorganic Chemical Engineering Technics" edited by FU Dexue, Jul. 1, 1999, pp. 65-71, (No English language Abstract of translation provided).

* cited by examiner

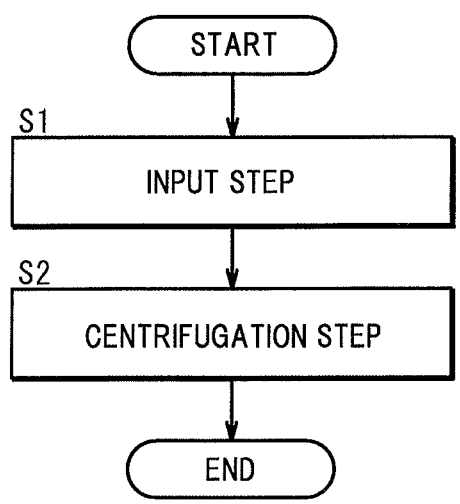

POWDER FOR CONDUCTIVE MATERIAL, INK FOR CONDUCTIVE MATERIAL, CONDUCTIVE PASTE, AND METHOD FOR PRODUCING POWDER FOR CONDUCTIVE MATERIAL

TECHNICAL FIELD

The present invention relates to a powder for a conductive material, an ink for a conductive material, a conductive paste, and a method for producing a powder for conductive material. The present application claims priority from Japanese Patent Application No. 2015-192948 filed on Sep. 30, 2015, and the entire contents of the Japanese application are incorporated herein by reference.

BACKGROUND ART

Inks for conductive materials, the inks containing a dispersion medium (liquid) and a metal powder dispersed in the dispersion medium, and conductive pastes that contain a polymer composition and a metal powder contained in the polymer composition are used for the purpose of, for example, forming conductive patterns of printed circuit boards.

As the metal powder used in such an ink for a conductive material or such a conductive paste, a metal powder containing copper, which is relatively inexpensive and has good electrical conductivity, as a main component is suitably used. However, since a copper powder is relatively easily oxidized, the electrical conductivity may decrease and the particle shape and the particle size may vary in the production.

In view of this, it has been proposed that a small amount of aluminum is contained inside powder particles for a conductive paste, the powder particles containing copper as a main component, to improve oxidation resistance of the powder particles, to prevent electrical conductivity from decreasing, and to stabilize the production of the powder, thereby reducing variations in the particle shape and the particle size (Japanese Unexamined Patent Application Publication No. 2009-235556).

CITATION LIST

Patent Literature

PTL 1: Japanese Unexamined Patent Application Publication No. 2009-235556

SUMMARY OF INVENTION

A powder for a conductive material according to an embodiment of the present invention is a powder for a conductive material, the powder including a large number of particles that contain copper as a main component and having an average primary particle diameter of 1 nm or more and 200 nm or less. The particles contain titanium on surfaces or inside thereof, and a content of the titanium is 0.003 atomic percent or more and 0.5 atomic percent or less.

A method for producing a powder for a conductive material according to another embodiment of the present invention is a method for producing a powder for a conductive material by using a liquid-phase reduction method, the powder including a large number of particles that contain copper as a main component and having an average primary particle diameter of 1 nm or more and 200 nm or less. The method includes a step of inputting a raw material aqueous solution containing a copper ion into a reducing agent aqueous solution containing a trivalent titanium ion. In the method, an input rate of the raw material aqueous solution is 0.01 mol·$L^{-1}$·$s^{-1}$ or more in terms of amount of copper ion per unit amount of a synthesis liquid obtained by inputting the raw material aqueous solution into the reducing agent aqueous solution.

BRIEF DESCRIPTION OF DRAWING

The Drawing is a flowchart illustrating a method for producing a powder for a conductive material according to an embodiment of the present invention.

REFERENCE SIGNS LIST

| | |
|---|---|
| S1 | input step |
| S2 | centrifugation step |

Description of Embodiments

Technical Problem

Since the copper powder for a conductive paste disclosed in the above patent application publication is produced by an atomizing method, the copper powder has a relatively large particle diameter. Accordingly, it is difficult to apply the conductive paste disclosed in the patent application publication so as to have a uniform and small thickness. Thus, the conductive paste is not suitable for use in forming, for example, a conductive thin film serving as a plating base layer. Furthermore, the conductive paste disclosed in the patent application publication is disadvantageous in that it is difficult to improve smoothness of the surface of the resulting conductive layer due to the particle diameter of the copper powder.

The present invention has been made in view of the circumstances described above. An object of the present invention is to provide a powder for a conductive material, an ink for a conductive material, and a conductive paste that are capable of forming a conductive layer having a relatively small thickness and a smooth surface, and a method for producing the powder for a conductive material.

Advantageous Effects of Invention

A powder for a conductive material according to an embodiment of the present invention and a powder for a conductive material obtained by a method for producing a powder for a conductive material according to another embodiment of the present invention can provide a conductive layer having a relatively small thickness and a smooth surface.

Description of Embodiments of the Present Invention

A powder for a conductive material according to an embodiment of the present invention is a powder for a conductive material, the powder including a large number of particles that contain copper as a main component and having an average primary particle diameter of 1 nm or more and 200 nm or less. The particles contain titanium on surfaces or inside thereof, and a content of the titanium is 0.003 atomic percent or more and 0.5 atomic percent or less.

The powder for a conductive material contains titanium on surfaces or inside of the particles, and a content of the titanium is 0.003 atomic percent or more and 0.5 atomic percent or less. Therefore, during sintering, the titanium limits melting of the particles of the powder for a conductive material and can suppress coarsening due to complete fusion between the particles. Therefore, use of the powder for a conductive material enables formation of a conductive layer having a relatively small thickness and a smooth surface.

The titanium is preferably contained inside the particles. When the titanium is contained inside the particles of the powder for a conductive material, it is relatively easy to connect the particles together to the extent that electrical conductivity is achieved while coarsening of the particles is suitably suppressed.

The particles preferably contain chlorine on surfaces or inside thereof, and a content of the chlorine is preferably 0.05 atomic percent or more and 5 atomic percent or less. When the powder for a conductive material contains chlorine on surfaces or inside of the particles and a content of the chlorine is within the above range, inhibition of partial fusion (neck formation) of particle surfaces, the inhibition being due to generation of titanium oxide, which has a high melting point, is prevented and thus conductive connection between the particles can be more reliably achieved.

An ink for a conductive material according to another embodiment of the present invention is an ink for a conductive material, the ink including an aqueous dispersion medium and the above-described powder for a conductive material, the powder being dispersed in the aqueous dispersion medium.

Since the ink for a conductive material contains the powder for a conductive material, the powder being dispersed in an aqueous dispersion medium, a conductive layer having a relatively small thickness and a smooth surface can be formed.

A conductive paste according to still another embodiment of the present invention is a conductive paste including a polymer composition and the above-described powder for a conductive material, the powder being contained in the polymer composition.

Since the conductive paste contains the powder for a conductive material in a polymer composition, a conductive layer having a relatively small thickness and a smooth surface can be formed.

Furthermore, a method for producing a powder for a conductive material according to another embodiment of the present invention is a method for producing a powder for a conductive material by using a liquid-phase reduction method, the powder including a large number of particles that contain copper as a main component and having an average primary particle diameter of 1 nm or more and 200 nm or less. The method includes a step of inputting a raw material aqueous solution containing a copper ion into a reducing agent aqueous solution containing a trivalent titanium ion. In the method, an input rate of the raw material aqueous solution is 0.01 $mol \cdot L^{-1} \cdot s^{-1}$ or more in terms of amount of copper ion per unit amount of a synthesis liquid obtained by inputting the raw material aqueous solution into the reducing agent aqueous solution.

According to the method for producing a powder for a conductive material, in the step of inputting a raw material aqueous solution containing a copper ion into a reducing agent aqueous solution containing a trivalent titanium ion, an input rate of the raw material aqueous solution is 0.01 $mol \cdot L^{1} \cdot s^{-1}$ or more in terms of amount of copper ion per unit amount of a synthesis liquid obtained by inputting the raw material aqueous solution into the reducing agent aqueous solution. In this case, since the precipitation rate of copper is high, titanium can be incorporated inside the copper particles. According to the method for producing a powder for a conductive material, when the produced powder for a conductive material is fired, titanium limits melting of copper to thereby suppress coarsening due to complete fusion between the particles. Thus, according to the method for producing a powder for a conductive material, it is possible to produce a powder for a conductive material, the powder being capable of forming a conductive layer having a relatively small thickness and a smooth surface.

The method preferably further includes a step of centrifuging the synthesis liquid, and a centrifugal acceleration in the centrifugation is preferably 20,000 G or more. When the method further includes a step of centrifuging the synthesis liquid and the centrifugal acceleration in the centrifugation is the lower limit or more, titanium adhering to the surfaces of the particles can be allowed to remain. Note that the symbol "G" represents the gravitational acceleration.

Herein, the expression "contains copper as a main component" means that the copper content by mass is 50% by mass or more and preferably 90% by mass or more. The copper may be present in the form of a copper alloy or a compound such as copper oxide (CuO, $Cu_2O$), copper hydroxide ($Cu(OH)_2$), or the like. The term "average primary particle diameter" refers to a value measured in accordance with JIS-H7804 (2005).

Details of Embodiment of the Present Invention

Hereinafter, embodiments of the present invention will be described in detail with reference to the drawing as required.
[Powder for Conductive Material]

A powder for a conductive material according to an embodiment of the present invention includes a large number of particles containing copper as a main component and used for forming a layer having electrical conductivity.

The lower limit of the average primary particle diameter of the powder for a conductive material is 1 nm, preferably 5 nm, and more preferably 10 nm. The upper limit of the average primary particle diameter of the powder for a conductive material is 200 nm, preferably 150 nm, and more preferably 100 nm. When the average primary particle diameter of the powder for a conductive material is less than the lower limit, dispersibility may become insufficient when an ink for a conductive material or a conductive paste described below is formed. In contrast, when the average primary particle diameter of the powder for a conductive material exceeds the upper limit, it may become difficult to thinly and uniformly stack, that is, it may become difficult to thinly and uniformly apply an ink for a conductive material or a conductive paste.

The powder for a conductive material contains titanium on the surfaces or inside of the particles. The titanium contained on the surfaces or inside of the particles suppresses coarsening due to fusion of the particles during firing of the powder for a conductive material. With this structure, a conductive layer formed by sintering the powder for a conductive material has relatively good smoothness.

The lower limit of the content of titanium in the powder for a conductive material is 0.003 atomic percent, preferably 0.005 atomic percent, and more preferably 0.01 atomic percent. The upper limit of the content of titanium in the powder for a conductive material is 0.5 atomic percent, preferably 0.4 atomic percent, and more preferably 0.3 atomic percent. When the content of titanium in the powder for a conductive material is less than the lower limit, fusion of the particles cannot be sufficiently suppressed, and the smoothness of a conductive layer formed by sintering the powder for a conductive material may not be sufficiently ensured. In contrast, when the content of titanium in the powder for a conductive material exceeds the upper limit, necks that electrically connect the particles together (portions where the surfaces of the particles are fused together) cannot be easily formed, and a conductive layer formed by sintering the powder for a conductive material may have insufficient electrical conductivity.

In the powder for a conductive material, titanium is preferably contained inside the particles. When titanium is contained inside the particles of the powder for a conductive material, it is relatively easy to connect the particles together to the extent that electrical conductivity is achieved while coarsening of the particles during sintering is suitably suppressed.

The powder for a conductive material preferably contains chlorine on the surfaces or inside of the particles. The chlorine contained on the surfaces or inside of the particles of the powder for a conductive material prevents generation of titanium oxide, which has a high melting point, and enables the particles to be connected together more reliably.

The lower limit of the content of chlorine in the powder for a conductive material is preferably 0.05 atomic percent and more preferably 0.1 atomic percent. The upper limit of the content of chlorine in the powder for a conductive material is preferably 5 atomic percent and more preferably 3 atomic percent. When the content of chlorine in the powder for a conductive material is less than the lower limit, the generation of titanium oxide may not be sufficiently suppressed. In contrast, when the content of chlorine in the powder for a conductive material exceeds the upper limit, sufficient electrical connection between the particles may not be achieved.

[Method for Producing Powder for Conductive Material]

Next, a method for procuring the powder for a conductive material will be described in detail.

The powder for a conductive material can be produced by a liquid-phase reduction method (may be referred to as a titanium redox process) including a step of inputting a raw material aqueous solution containing a copper ion into a reducing agent aqueous solution containing a trivalent titanium ion, for example, as illustrated in the Drawing.

A method for producing a powder for a conductive material illustrated in the Drawing includes a step of inputting a raw material aqueous solution containing a copper ion into a reducing agent aqueous solution containing a trivalent titanium ion serving as a reducing agent (step S1: input step), and a step of centrifuging a synthesis liquid prepared by inputting the raw material aqueous solution into the reducing agent aqueous solution in the input step (step S2: centrifugation step).

<Input Step>

In the input step of step S1, a raw material aqueous solution is input into a reducing agent aqueous solution while the reducing agent aqueous solution is stirred.

(Reducing Agent Aqueous Solution)

Examples of the reducing agent aqueous solution that can be used include an aqueous solution prepared by dissolving a water-soluble titanium compound that produces a trivalent titanium ion in water, and an aqueous solution in which a tetravalent titanium ion in an aqueous solution is subjected to electrolytic reduction to be converted into a trivalent titanium ion. An example of the compound that produces a trivalent titanium ion is titanium trichloride. Alternatively, a commercially available high-concentration titanium trichloride aqueous solution may be used.

The lower limit of the initial concentration (the concentration before a raw material aqueous solution is input) of trivalent titanium ions of the reducing agent aqueous solution is preferably 0.01 mol/L, more preferably 0.03 mol/L, and still more preferably 0.05 mol/L. The upper limit of the initial concentration of trivalent titanium ions of the reducing agent aqueous solution is preferably 2 mol/L, more preferably 1.5 mol/L, and still more preferably 1 mol/L. When the initial concentration of trivalent titanium ions in the reducing agent aqueous solution is less than the lower limit, the precipitation rate of copper is insufficient, and titanium may not be sufficiently incorporated inside the particles. In contrast, when the initial concentration of trivalent titanium ions in the reducing agent aqueous solution exceeds the upper limit, the resulting powder for a conductive material may have uneven particle shape, and the particle diameter of the powder may vary.

The reducing agent aqueous solution may further contain, for example, a complexing agent, a dispersant, a pH adjusting agent, etc.

Various conventionally known complexing agents can be used as the complexing agent mixed in the reducing agent aqueous solution. However, in order to incorporate titanium in particles of a powder for a conductive material to be produced, it is effective to decrease the time of the reduction reaction as short as possible when an ion of a metal element is reduced by oxidation of a trivalent titanium ion and precipitated. In order to realize this, it is effective to control both the oxidation reaction rate of the trivalent titanium ion and the reduction reaction rate of the metal element ion. For this purpose, it is important to form complexes of both the trivalent titanium ion and the metal element ion.

Examples of the complexing agents having such a function include trisodium citrate [$Na_3C_6H_5O_7$], sodium tartrate [$Na_2C_4H_4O_6$], sodium acetate [$NaCH_3CO_2$], gluconic acid [$C_5H_{12}O_7$], sodium thiosulfate [$Na_2S_2O_3$], ammonia [$NH_3$], and ethylenediaminetetraacetic acid [$C_{10}H_{16}N_2O_8$]. One or two or more of these complexing agents can be used. Of these, trisodium citrate is suitable.

As the dispersant mixed in the reducing agent aqueous solution, for example, an anionic dispersant, a cationic dispersant such as polyethyleneimine, or a nonionic dispersant such as polyvinylpyrrolidone can be used.

As the pH adjusting agent mixed in the reducing agent aqueous solution, for example, sodium carbonate, ammonia, or sodium hydroxide can be used. The pH of the reducing agent aqueous solution may be, for example, 5 or more and 13 or less. When the pH of the reducing agent aqueous solution is excessively low, the precipitation rate of the metal is low, and the particle size distribution tends to be wide. When the pH of the reducing agent aqueous solution is excessively high, the precipitation rate of the metal becomes excessively high, and the precipitated powder for a conductive material is aggregated, which may result in the formation of cluster-like or chain-like coarse particles.

The lower limit of the temperature of the reducing agent aqueous solution is preferably 0° C., more preferably 15° C., and still more preferably 30° C. The upper limit of the temperature of the reducing agent aqueous solution is preferably 100° C. and more preferably 60° C. When the temperature of the reducing agent aqueous solution is less than the lower limit, a sufficient reaction rate may not be achieved, and titanium may not be sufficiently incorporated inside the particles. In contrast, when the temperature of the reducing agent aqueous solution exceeds the upper limit, the energy cost may be unnecessarily increased.

(Raw Material Aqueous Solution)

An example of the raw material aqueous solution that can be used is an aqueous solution in which a copper ion is produced by dissolving a water-soluble copper compound in water to ionize the water-soluble copper compound. Examples of the water-soluble copper compound that produces a copper ion include copper(II) nitrate [$Cu(NO_3)_2$], copper(II) sulfate pentahydrate [$CuSO_4.5H_2O$], and copper (II) chloride [$CuCl_2$].

The lower limit of the copper ion concentration of the raw material aqueous solution is preferably 0.05 mol/L and more preferably 0.1 mol/L. The upper limit of the copper ion concentration of the raw material aqueous solution is preferably 10 mol/L and more preferably 5 mol/L. When the copper ion concentration of the raw material aqueous solution is less than the lower limit, the precipitation rate of copper is insufficient, and titanium may not be sufficiently incorporated inside the particles. In contrast, when the copper ion concentration of the raw material aqueous solution exceeds the upper limit, the resulting powder for a conductive material may have uneven particle shape, and the particle diameter of the powder may vary.

The lower limit of the input rate of the raw material aqueous solution is 0.01 $mol \cdot L^{-1} \cdot s^{-1}$, preferably 0.02 $mol \cdot L^{-1} \cdot s^{-1}$, and more preferably 0.03 $mol \cdot L^{-1} \cdot s^{-1}$ in terms of amount of copper ion per unit amount of a synthesis liquid obtained by inputting the raw material aqueous solution into the reducing agent aqueous solution. The upper limit of the input rate of the raw material aqueous solution is preferably 0.1 $mol \cdot L^{-1} \cdot s^{-1}$ and more preferably 0.05 $mol \cdot L^{-1} \cdot s^{-1}$. When the input rate of the raw material aqueous solution is less than the lower limit, titanium may not be sufficiently incorporated inside the particles. In contrast, when the input rate of the raw material aqueous solution exceeds the upper limit, the particle diameter and the particle shape may become uneven. That is, an input rate of the raw material aqueous solution of the lower limit or more enables production of the powder for a conductive material, the powder being capable of forming a conductive layer having a relatively small thickness and a smooth surface.

The temperature of the raw material aqueous solution is preferably equal to or substantially equal to the temperature of the reducing agent aqueous solution. In the case where the temperature of the raw material aqueous solution is different from the temperature of the reducing agent aqueous solution, temperature unevenness may occur and the reaction may proceed nonuniformly.

The lower limit of the amount of input of the raw material aqueous solution is preferably 0.2 and more preferably 0.3 in terms of molar ratio of copper ion to trivalent titanium ion. The upper limit of the amount of input of the raw material aqueous solution is preferably 0.7 and more preferably 0.6 in terms of the molar ratio. When the amount of input of the raw material aqueous solution is less than the lower limit, the utilization ratio of the reducing agent becomes low, which may be uneconomical. In contrast, when the amount of input of the raw material aqueous solution exceeds the upper limit, the reaction rate decreases in the latter half of the reaction, and titanium may not be sufficiently incorporated inside the particles.

The concentrations of the reducing agent aqueous solution and the raw material aqueous solution, and the amount of input of the raw material aqueous solution are preferably selected such that, in the ranges described above, the concentration of copper (copper ions and copper in the precipitated particles) in the synthesis liquid obtained by inputting the raw material aqueous solution into the reducing agent aqueous solution is within a certain range. The lower limit of the concentration of copper in the synthesis liquid is preferably 0.02 mol/L and more preferably 0.04 mol/L. The upper limit of the concentration of copper in the synthesis liquid is preferably 0.5 mol/L and more preferably 0.3 mol/L. When the concentration of copper in the synthesis liquid is less than the lower limit, production efficiency decreases, which may result in an increase in the cost. In contrast, when the concentration of copper in the synthesis liquid exceeds the upper limit, the resulting powder for a conductive material may have uneven particle shape, and the particle diameter of the powder may vary.

<Centrifugation Step>

In the centrifugation step of step S2, the aqueous solution after the input step, that is, the synthesis liquid prepared by inputting the raw material aqueous solution into the reducing agent aqueous solution is centrifuged to separate the particles precipitated from the synthesis liquid.

The lower limit of the centrifugal acceleration in this centrifugation is preferably 20,000 G and more preferably 21,000 G. The upper limit of the centrifugal acceleration in this centrifugation is preferably 40,000 G and more preferably 30,000 G. When the centrifugal acceleration in the centrifugation is less than the lower limit, titanium contained in the particles is removed by separation, and a sufficient content of titanium may not be obtained. In contrast, when the centrifugal acceleration in the centrifugation exceeds the upper limit, the impurity content may increase or the production cost may be unnecessarily increased.

In the centrifugation step, centrifugation may be repeated a plurality of times. Specifically, water is added to the centrifuged particles, the resulting mixture is stirred, and the mixture is further centrifuged, thus further removing impurities from the synthesis liquid. In order to make handling easy after centrifugation, water may be added to the centrifuged particles to prepare a slurry, and the particles may be thus removed from the synthesis liquid.

[Ink for Conductive Material]

Next, an ink for a conductive material according to another embodiment of the present invention will be described in detail.

The ink for a conductive material includes an aqueous dispersion medium and the powder for a conductive material, the powder being dispersed in the aqueous dispersion medium. Specifically, the ink for a conductive material is obtained by dispersing the above-described powder for a conductive material in an aqueous dispersion medium. The ink for a conductive material may contain an additive such as a dispersant.

<Aqueous Dispersion Medium>

As the aqueous dispersion medium of the ink for a conductive material, water or a mixture of water and a highly polar solvent is used. In particular, a mixture of water and a highly polar solvent compatible with water is suitably used. The reducing agent aqueous solution after precipitation of the powder for a conductive material may be adjusted and used as such an aqueous dispersion medium. More specifically, the reducing agent aqueous solution containing a powder for a conductive material is in advance subjected to processes such as ultrafiltration, centrifugation, and electrodialysis to remove impurities, and a highly polar solvent is added to the resulting aqueous solution, to thereby obtain an aqueous dispersion medium containing the powder for a conductive material in advance in a certain amount.

The highly polar solvent in the aqueous dispersion medium is preferably a volatile organic solvent that can be evaporated within a short time during firing. When such a volatile organic solvent is used as the highly polar solvent, the highly polar solvent is volatilized within a short time during firing to rapidly increase the viscosity of the ink applied to a surface of a base material without causing movement of the powder for a conductive material.

Various organic solvents having volatility at room temperature (5° C. or higher and 35° C. or lower) can be used as the volatile organic solvent. Of these, volatile organic solvents having a boiling point of, for example, 60° C. or higher and 140° C. or lower at ordinary pressure are preferred. In particular, aliphatic saturated alcohols having 1 to 5 carbon atoms, which have high volatility and good compatibility with water, are preferred. Examples of the aliphatic saturated alcohols having 1 to 5 carbon atoms include methyl alcohol, ethyl alcohol, n-propyl alcohol, isopropyl alcohol, n-butyl alcohol, isobutyl alcohol, secondary butyl alcohol, tertiary butyl alcohol, n-amyl alcohol, and isoamyl alcohol. These aliphatic saturated alcohols may be used alone or as a mixture of two or more thereof.

The lower limit of the content of the volatile organic solvent in the whole aqueous dispersion medium is preferably 30% by mass and more preferably 40% by mass. The upper limit of the content of the volatile organic solvent in the whole aqueous dispersion medium is preferably 80% by mass and more preferably 70% by mass. When the content of the volatile organic solvent in the whole aqueous dispersion medium is less than the lower limit, the viscosity of the ink may not be increased within a short time during firing. When the content of the volatile organic solvent in the whole aqueous dispersion medium exceeds the upper limit, the content of water becomes relatively low and thus sufficient wettability of the ink to surfaces of various base materials such as glass, ceramics, and plastics may not be obtained.

Examples of the highly polar solvent other than the volatile organic solvent include ethylene glycol, propylene glycol, and glycerin. These may be used alone or as a mixture of two or more thereof. These highly polar solvents function as a binder that prevents a powder for a conductive material from moving during firing.

The lower limit of the content of the whole aqueous dispersion medium in the ink for a conductive material is preferably 100 parts by mass and more preferably 400 parts by mass relative to 100 parts by mass of the powder for a conductive material. The upper limit of the content of the whole aqueous dispersion medium in the ink for a conductive material is preferably 3,000 parts by mass and more preferably 1,000 parts by mass relative to 100 parts by mass of the powder for a conductive material. When the content of the whole aqueous dispersion medium in the ink for a conductive material is less than the lower limit, the ink for a conductive material has a high viscosity, which may result in difficulty in coating. When the content of the whole aqueous dispersion medium in the ink for a conductive material exceeds the upper limit, the ink for a conductive material has a low viscosity, and a coating film having a sufficient thickness may not be formed in coating.

Since the ink for a conductive material includes the powder for a conductive material, the powder being dispersed in the aqueous dispersion medium, a conductive layer having a relatively small thickness and a smooth surface can be formed on a surface of a base material layer by application of the ink to the base material layer and firing. Specifically, for example, a thin and smooth conductive layer is formed on a surface of a base film for a flexible printed circuit board by application to the base film and firing, and plating or the like is further performed. Thus, a conductive layer of the flexible printed circuit board can be formed.

[Conductive Paste]

Next, a conductive paste according to another embodiment of the present invention will be described in detail.

The conductive paste includes a polymer composition and the powder for a conductive material, the powder being contained in the polymer composition.

A mixture of a resin and a solvent is suitably used as the polymer composition. Examples of the resin that can be used in the polymer composition include cellulose-based resins such as methylcellulose, ethylcellulose, nitrocellulose, cellulose acetate, and cellulose propionate; acrylic esters such as methyl (meth)acrylate, ethyl (meth)acrylate, and propyl (meth)acrylate; alkyd resins; and polyvinyl alcohol. From the viewpoint of, for example, safety and stability, ethylcellulose is particularly suitably used. Examples of the solvent in the polymer composition include terpineol, tetrarin, butyl carbitol, butyl carbitol acetate, and carbitol acetate. These solvents may be used alone or as a mixture thereof.

The conductive paste can be produced by first preparing a polymer composition in which the resin is dissolved in the solvent, subsequently mixing the powder for a conductive material and the polymer composition, and kneading and dispersing the resulting mixture with a triple roll, a ball mill, or the like. The conductive paste may contain, for example, barium titanate or the like as a dielectric material or an additive for adjusting sintering.

Since the conductive paste includes the powder for a conductive material, the powder being contained in the polymer composition, a conductive layer having a relatively small thickness and a smooth surface can be formed. Specifically, for example, a conductive pattern having a smooth surface can be formed on a surface of a base film for a flexible printed circuit board by printing the conductive paste on the base film.

Other Embodiments

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and scope of the claims and their equivalents.

The method for producing the powder for a conductive material is not limited to the production method using the liquid-phase reduction method. Alternatively, the powder for a conductive material may be produced by another production method such as a high-temperature treatment method or a gas-phase method.

In the method for producing the powder for a conductive material, the centrifugation step is not essential. The powder for a conductive material may be removed from the aqueous solution by another means such as filtration, membrane separation, or sedimentation.

Examples

The present invention will now be described in detail by using Examples. The description of Examples does not limit the interpretation of the present invention.

(Reducing Agent Aqueous Solution)

In a beaker, 80 g (about 0.1 mol) of a titanium trichloride solution serving as a reducing agent, 50 g of sodium carbonate serving as a pH adjusting agent, 90 g of sodium citrate serving as a complexing agent, and 1 g of polyvinylpyrrolidone (molecular weight: 30,000) serving as a dispersant were dissolved in pure water such that the resulting reducing agent aqueous solution had a volume of 0.8 L.
(Raw Material Aqueous Solution)

In pure water, 10 g (about 0.04 mol) of copper nitrate trihydrate was dissolved such that the resulting raw material aqueous solution had a volume of 0.2 L.

Trial products Nos. 1 to 6 of powders for conductive materials were prepared by using the reducing agent aqueous solution and the raw material aqueous solution prepared as described above under the conditions described below.
(Trial Product No. 1)

The temperatures of the reducing agent aqueous solution and the raw material aqueous solution were maintained at 35° C. The raw material aqueous solution was input into the reducing agent aqueous solution over a period of two seconds while the reducing agent aqueous solution was stirred to precipitate metal particles containing copper as a main component. Specifically, the input rate of the raw material aqueous solution was 0.02 $mol \cdot L^{-1} \cdot s^{-1}$ in terms of amount of copper ion per unit amount of a synthesis liquid.

Subsequently, the aqueous solution in which the metal particles were precipitated was centrifuged with a centrifuge. A centrifuge "T15A37" available from Hitachi Koki Co., Ltd. was used, and the centrifugal acceleration was set to 21,000 G (the number of revolutions: 15,000 rpm). After centrifugation, the supernatant was discharged. Pure water was poured into the column in which metal particles remained, and stirring was conducted. Subsequently, centrifugation was again conducted at a centrifugal acceleration of 21,000 G. Specifically, the centrifugation was conducted twice. Thus, a trial product No. 1 of a powder for a conductive material was prepared.
(Trial Product No. 2)

A trial product No. 2 of a powder for a conductive material was prepared under the same conditions as in the trial product No. 1 except that the input time of the raw material aqueous solution was one second (0.04 $mol \cdot L^{-1} \cdot s^{-1}$ in terms of input rate of copper ion on a synthesis liquid basis).
(Trial Product No. 3)

A trial product No. 3 of a powder for a conductive material was prepared under the same conditions as in the trial product No. 1 except that the centrifugal acceleration in the centrifugation was set to 30,000 G.
(Trial Product No. 4)

A trial product No. 4 of a powder for a conductive material was prepared under the same conditions as in the trial product No. 1 except that the temperatures of the reducing agent aqueous solution and the raw material aqueous solution were maintained at 50° C.

(Trial Product No. 5)

A trial product No. 5 of a powder for a conductive material was prepared under the same conditions as in the trial product No. 1 except that the input time of the raw material aqueous solution was five seconds (0.008 $mol \cdot L^{-1} \cdot s^{-1}$ in terms of input rate of copper ion on a synthesis liquid basis).
(Trial Product No. 6)

A trial product No. 6 of a powder for a conductive material was prepared under the same conditions as in the trial product No. 1 except that the centrifugal acceleration in the centrifugation was set to 15,000 G.
(Average Primary Particle Diameter)

The surfaces of the trial products Nos. 1 to 6 of the powders for conductive materials were observed with a scanning electron microscope (SEM) at a magnification of 100 k to 300 k to measure the sizes of 100 fine metal particles that were arbitrarily selected. The particle diameter [nm] at which the cumulative volume became 50% when the volume of the particles was accumulated in the ascending order of the particle diameter was calculated and defined as an average primary particle diameter.
(Component Analysis)

Contents of titanium and chlorine in the trial products Nos. 1 to 6 of the powders for conductive materials were measured. The content of titanium was measured with an ICP analyzer (inductively coupled plasma emission spectrometer) "iCAP6300DUO" available from Thermo Fisher Scientific, Inc. The content of chlorine was measured by ion chromatography with "ICS-2100" available from Thermo Fisher Scientific, Inc.
(Formation of Conductive Layer)

Pure water was added to each of the trial products Nos. 1 to 6 of the powders for conductive materials to prepare inks for conductive materials, the inks each having a content of a powder for a conductive material of 30% by mass. Each of the inks for conductive materials was dripped on a surface of a polyimide film that had been subjected to a hydrophilic treatment and cut to have a 10-cm square shape, and bar-coating was conducted. Furthermore, the resulting coating films were naturally dried and then fired at 300° C. for 30 minutes in a nitrogen atmosphere to form conductive layers on the polyimide films.
(Surface Roughness)

Before and after the firing, a surface roughness (arithmetic average height Sa) was measured in accordance with ISO25178 as an index of smoothness of each of the coating films (conductive layers). A ratio of the surface roughness after firing to the surface roughness before firing was calculated as a ratio of change in the surface roughness before and after the firing of each of the coating films (conductive layers).

Table 1 below summarizes the conditions for trial production and measurement results of the surface roughness.

TABLE 1

| Trial product | No. 1 | No. 2 | No. 3 | No. 4 | No. 5 | No. 6 |
|---|---|---|---|---|---|---|
| Aqueous solution temperature (° C.) | 35 | 35 | 35 | 50 | 35 | 35 |
| Input time of raw material aqueous solution (s) | 2 | 1 | 2 | 2 | 5 | 2 |
| Input rate of raw material aqueous solution (mol/s/L) | 0.02 | 0.04 | 0.02 | 0.02 | 0.008 | 0.02 |
| Centrifugal acceleration (G) | 21,000 | 21,000 | 30,000 | 21,000 | 21,000 | 15,000 |
| Average primary particle diameter (nm) | 50 | 30 | 50 | 30 | 60 | 50 |
| Titanium content (atomic %) | 0.005 | 0.1 | 0.01 | 0.3 | 0.002 | 0.001 |
| Chlorine content (atomic %) | 0.1 | 1 | 0.5 | 3 | 0.05 | 0.1 |
| Surface roughness before firing (μm) | 0.05 | 0.04 | 0.08 | 0.03 | 0.06 | 0.05 |

TABLE 1-continued

| Trial product | No. 1 | No. 2 | No. 3 | No. 4 | No. 5 | No. 6 |
|---|---|---|---|---|---|---|
| Surface roughness after firing (μm) | 0.09 | 0.05 | 0.12 | 0.03 | 0.20 | 0.40 |
| Ratio of change in surface roughness before and after firing | 1.8 | 1.25 | 1.5 | 1.0 | 3.33 | 8.0 |

The results show the following. With an increase in the titanium content of the powder for a conductive material, the surface roughness of the conductive layer before and after firing, in particular, the surface roughness after firing is reduced. With an increase in the input rate of the raw material aqueous solution in the production, the titanium content of the powder for a conductive material increases. Specifically, the surface roughness after firing is reduced by increasing the input rate of the raw material aqueous solution in the production. An increase in the centrifugal acceleration also increases the titanium content and can improve the surface roughness.

The invention claimed is:

1. A powder for a conductive material, the powder comprising a large number of particles that contain copper as a main component and having an average primary particle diameter of 1 nm or more and 200 nm or less,
   wherein the particles contain titanium on surfaces or inside thereof,
   a content of the titanium is 0.003 atomic percent or more and 0.5 atomic percent or less,
   the particles contain chlorine on surfaces or inside thereof, and
   a content of the chlorine is 0.05 atomic percent or more and 5 atomic percent or less.

2. The powder for a conductive material according to claim 1, wherein the titanium is contained inside the particles.

3. An ink for a conductive material, the ink comprising:
   an aqueous dispersion medium; and
   the powder for a conductive material according to claim 1, the powder being dispersed in the aqueous dispersion medium.

4. A conductive paste comprising:
   a polymer composition; and
   the powder for a conductive material according to claim 1, the powder being contained in the polymer composition.

* * * * *